(12) United States Patent
Song et al.

(10) Patent No.: US 10,866,764 B2
(45) Date of Patent: Dec. 15, 2020

(54) MEMORY SYSTEM WITH PARITY CACHE SCHEME AND METHOD OF OPERATING SUCH MEMORY SYSTEM

(71) Applicant: SK hynix Inc., Gyeonggi-do (KR)

(72) Inventors: Jeffrey Song, San Jose, CA (US); Sean Lee, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/515,584

(22) Filed: Jul. 18, 2019

(65) Prior Publication Data

US 2020/0026472 A1 Jan. 23, 2020

Related U.S. Application Data

(60) Provisional application No. 62/702,090, filed on Jul. 23, 2018.

(51) Int. Cl.
*G06F 3/06* (2006.01)
*G06F 11/10* (2006.01)
*G06F 12/02* (2006.01)
*G06F 13/38* (2006.01)
*G06F 13/16* (2006.01)

(52) U.S. Cl.
CPC ............ *G06F 3/0659* (2013.01); *G06F 3/064* (2013.01); *G06F 3/0619* (2013.01); *G06F 3/0679* (2013.01); *G06F 11/1064* (2013.01); *G06F 12/0246* (2013.01); *G06F 13/1605* (2013.01); *G06F 13/382* (2013.01); *G06F 2212/1021* (2013.01); *G06F 2213/0042* (2013.01)

(58) Field of Classification Search
CPC .... G06F 3/0659; G06F 3/0619; G06F 3/0679; G06F 12/0246
USPC ........................................................ 711/158
See application file for complete search history.

(56) References Cited

U.S. PATENT DOCUMENTS

| 2006/0064532 | A1* | 3/2006 | Hur ........................ G06F 13/362 710/309 |
| 2013/0262761 | A1* | 10/2013 | Oh ......................... G06F 3/0659 711/114 |
| 2014/0380092 | A1 | 12/2014 | Kim et al. |
| 2016/0224420 | A1 | 8/2016 | Zhou et al. |
| 2016/0299687 | A1* | 10/2016 | Kim ........................ G06F 3/0659 |
| 2017/0109096 | A1* | 4/2017 | Jean ......................... G06F 9/00 |
| 2019/0286338 | A1* | 9/2019 | Noda ..................... G06F 3/0658 |

* cited by examiner

*Primary Examiner* — Than Nguyen
(74) *Attorney, Agent, or Firm* — IP & T Group LLP

(57) ABSTRACT

Within a memory system, architecture and operations for processing commands in a parity cache scheme support more open blocks taking into account cost and performance. Dynamic random access memory space holds parity buffers of all open blocks and communicates with a cache and cache controller. An open block queue (OBQ) accumulates commands in separate queues for each open block to increase cache hit rate. Open block counters keep track of the number of commands for each OBQ to facilitate arbitration. A unique identification (ID) is given for each open block.

17 Claims, 7 Drawing Sheets

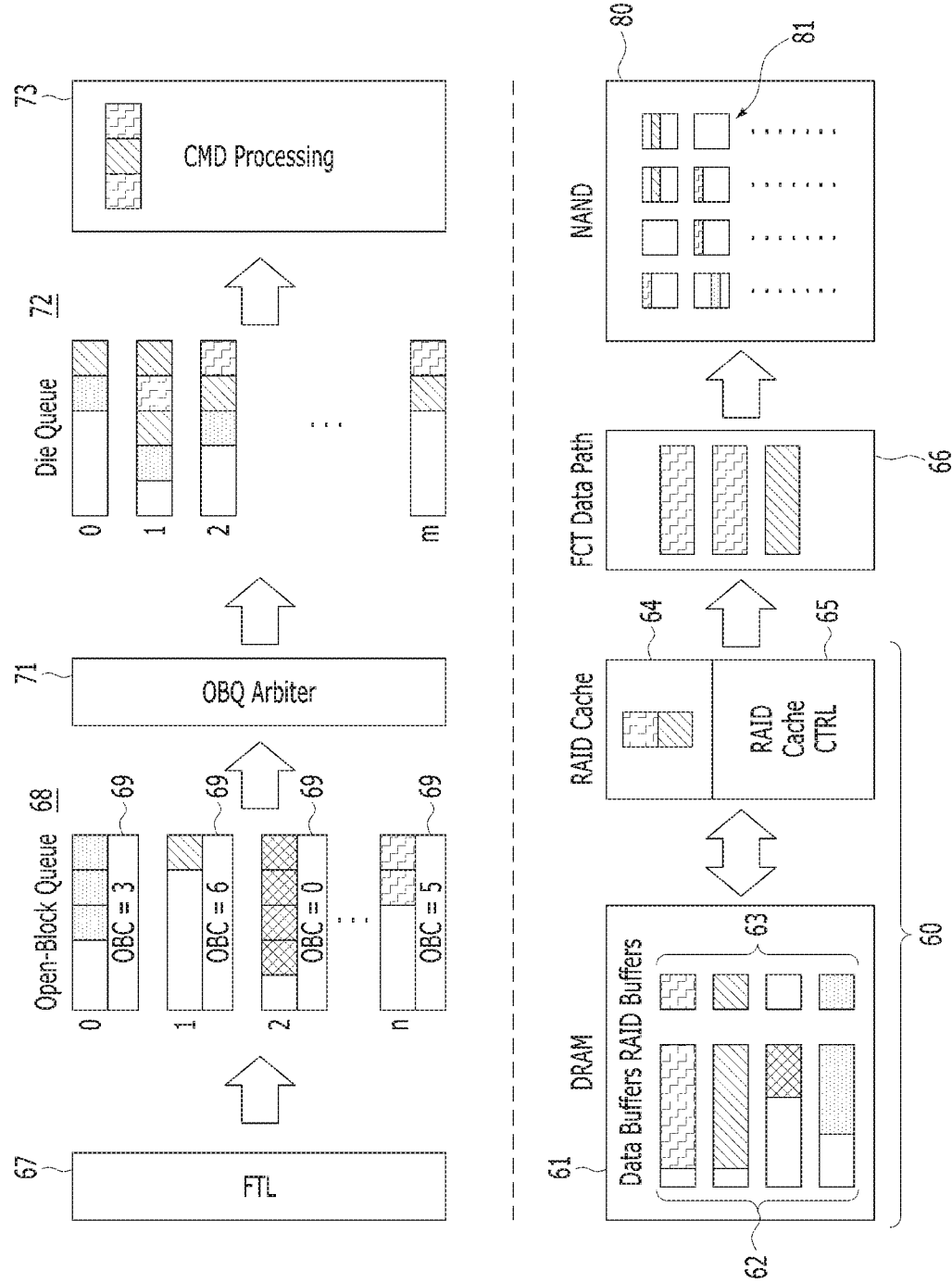

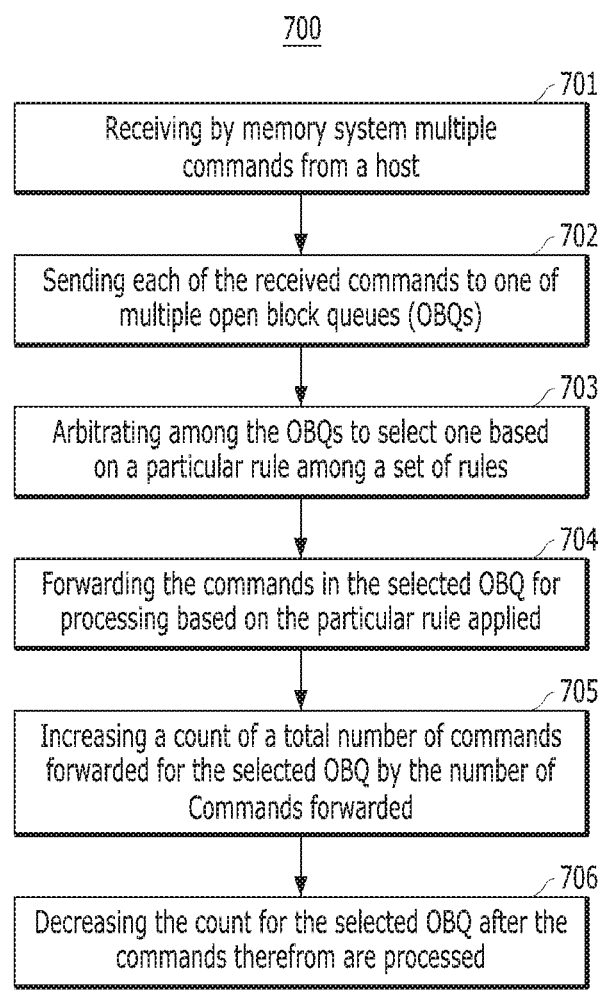

MEMORY SYSTEM WITH PARITY CACHE SCHEME AND METHOD OF OPERATING SUCH MEMORY SYSTEM

CROSS-REFERENCE TO RELATED APPLICATION

This application claims the benefit of U.S. Provisional Application No. 62/702,090, filed on Jul. 23, 2018, the entire contents of which are incorporated herein by reference.

BACKGROUND

1. Field

Embodiments of the present disclosure relate to a memory system having architecture to implement an improved parity cache scheme, and method of operating such memory system.

2. Description of the Related Art

The computer environment paradigm has shifted to ubiquitous computing systems that can be used anytime and anywhere. As a result, the use of portable electronic devices, such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices used as memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NAND-type flash memory operates primarily in memory cards, USB flash drives, solid-state drives (SSDs), and similar products, for general storage and transfer of data.

A flash memory, e.g., of the NAND-type, may apply any of various error correction techniques to correct errors in data. One such technique that may be applied in a redundant array of independent disks (RAID) system is RAID parity, e.g., Chipkill. Such technique is used to recover data when the storage device becomes corrupted. The RAID parity is generated by XORing all data in an open block in memory with a fixed unit, such as 8 KB. An open block in this instance is composed of NAND blocks from different NAND dies. All data within the same NAND block must be erased at the same time due to properties of a NAND device.

In this context embodiments of the present invention arise.

SUMMARY

Embodiments of the present invention provide architecture and operations for an improved cache parity scheme, particularly a RAID cache parity scheme, which may be employed in a parity scheme, e.g., RAID parity scheme.

An aspect of the present invention includes memory systems. Such a memory system comprises a memory device that includes open blocks, each having a unique identifier; and a memory controller. The memory controller includes a dynamic random access memory (DRAM) having parity buffers sized to accommodate all data of all of the open blocks, a cache and a cache controller in communication with the DRAM, open block queues corresponding to the open blocks respectively, each open block queue accumulating commands for the corresponding open block, open block counters, one associated with each of the open blocks, each open block counter maintaining an on-going count of the number of commands from the corresponding open block forwarded for processing, die queues corresponding to the open block queues respectively, and an arbiter configured to arbitrate with respect to the open block queues to determine an order in which commands are to be processed.

In another aspect, there is a command processing system, which comprises an arbiter to arbitrate with respect to open block queues, each of which holds a group of commands, to select one of the open block queues based on current counts of a number of commands forwarded from each of the open block queues for processing; die queues, one associated with each of the open block queues, to receive commands forwarded from the respective open block queues; and a command processor for processing commands from the die queues.

Further aspects of the present invention include methods of processing commands in a memory system including open blocks. Such method comprises sending each of multiple commands received by the memory system to one of multiple open block queues, each command containing a tag identifying a particular one of the open blocks; arbitrating among the open block queues to select one based on a set of rules that are selectively applied to increase cache hit rate; forwarding the commands in the selected open block queue for processing; increasing a count of a total number of commands forwarded for the selected open block queue by the number of commands forwarded in the forwarding operation; and decreasing the count after the commands from the selected open block queue are processed by the same number by which the count was increased in the increasing operation.

Additional aspects of the present invention will become apparent from the following description.

BRIEF DESCRIPTION OF THE DRAWINGS

FIG. 6 illustrates components and processing flow of a parity cache scheme in accordance with an embodiment of the present invention.

FIG. 7 is a flow chart illustrating steps for processing commands in a parity cache scheme in accordance with embodiments of the present invention.

DETAILED DESCRIPTION

Figure 1:
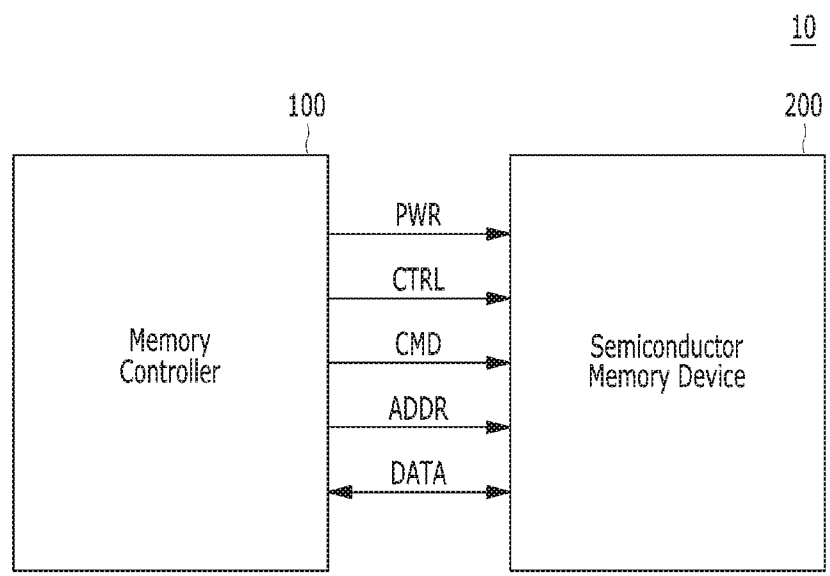
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type. For brevity, semiconductor memory device 200 is sometimes simply referred to as memory device 200.

The memory controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the memory system 10 is used in an SSD, operation speed of a host (not shown) coupled to the memory system 10 may remarkably improve.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
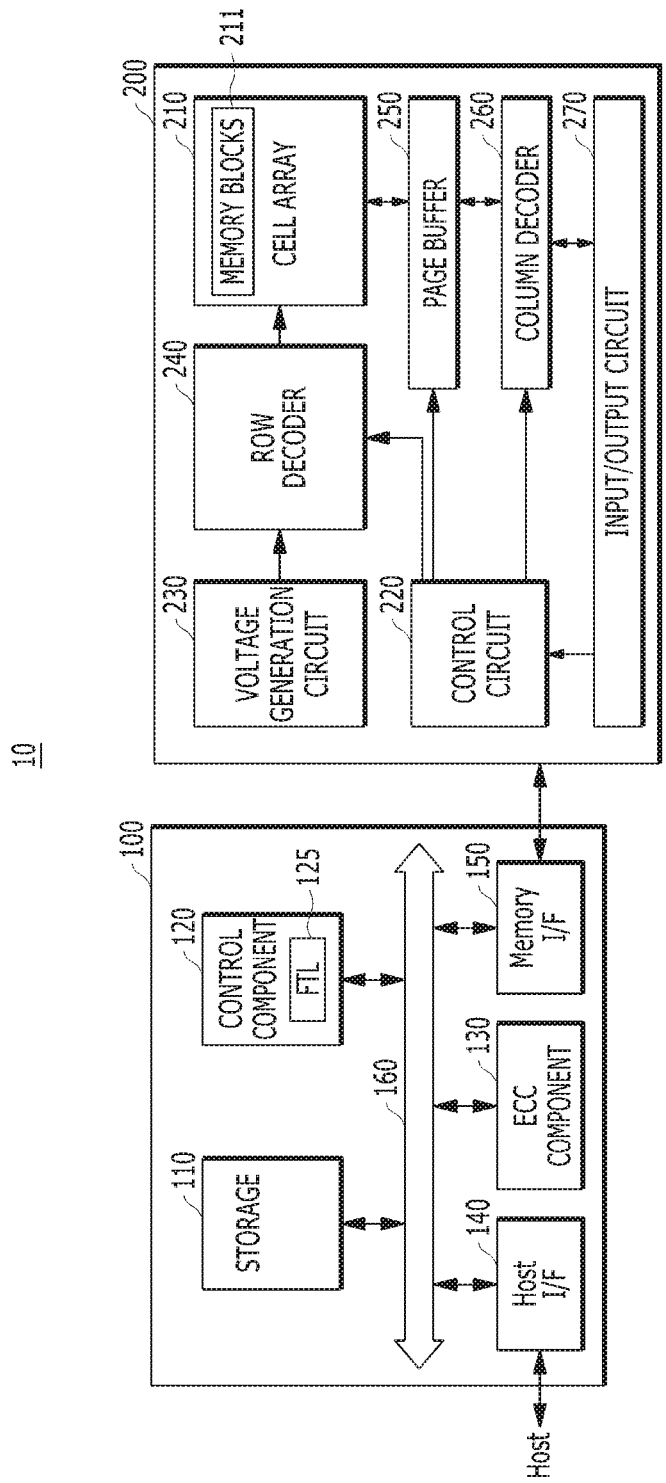
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor, e.g., a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) and/or a dynamic random access memory (DRAM).

As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL) 125, to control general operations of the memory system 10. For example, the FTL may perform operations, such as logical-to-physical (L2P) mapping, wear leveling, garbage collection, and/or bad block handling. The L2P mapping is known as logical block addressing (LBA). The FTL 125 is also involved in the improved parity cache scheme as described in more detail below.

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a block coded modulation (BCM).

The host interface 140 may communicate with the host device through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
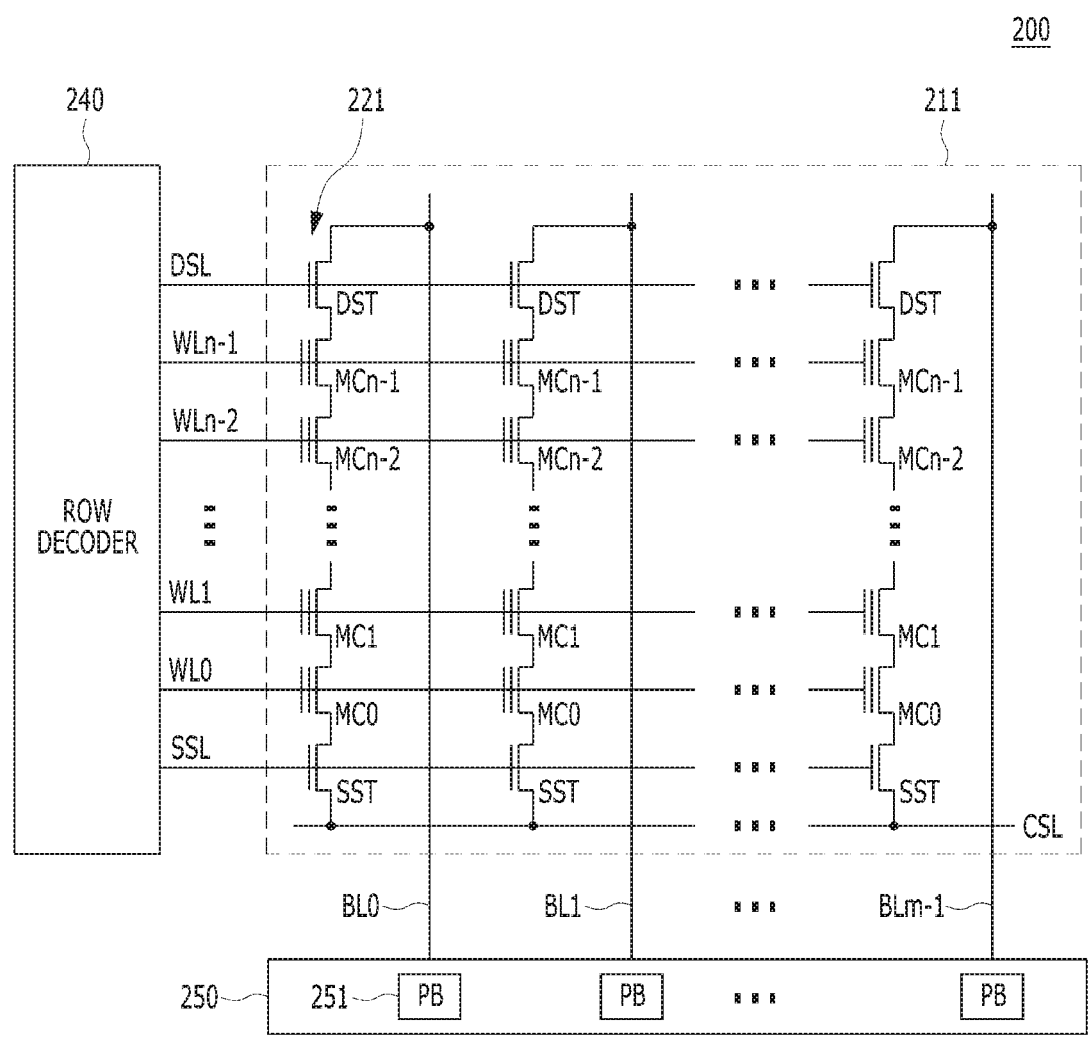
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
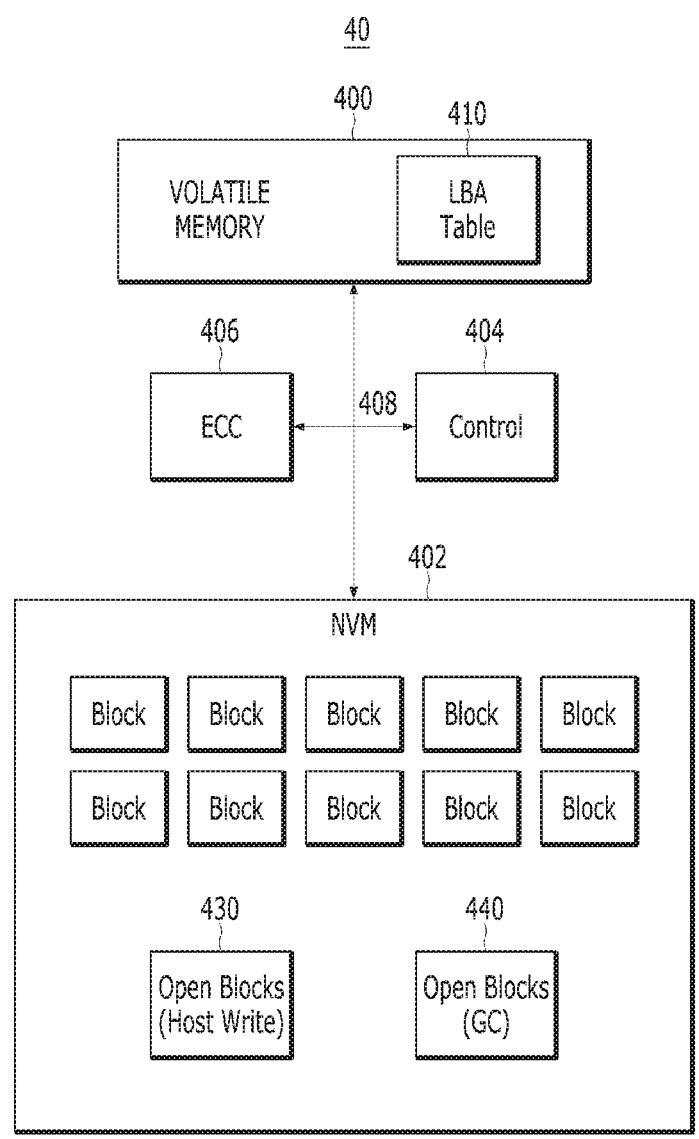
FIG. 4 is a schematic diagram of a memory system in accordance with an embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical hit address (LBA) table 410 for mapping physical-to-logical addresses of bits. The NVM 402 may include a plurality of memory blocks, as well as open blocks for host writes 430 and open blocks for garbage collection (GC) 440. The open blocks are described more below in the context of aspects of the invention.

Such components may be used to carry out aspects of a parity cache scheme, e.g. RAID parity cache scheme, as described below. Additional/alternative components that may be utilized with memory systems to effectuate the present invention will be understood to those of skill in the art in light of this disclosure.

As previously noted, RAID parity, e.g., Chipkill, is used to recover data when the storage device becomes corrupted. The RAID parity is generated by XORing all data in an open block in memory with a fixed unit, such as 8 KB. An open block in this instance is composed of NAND blocks from different NAND dies. All data within the same NAND block must be erased at the same time due to properties of a NAND device.

In general, the firmware accumulates data that has similar property to that in an open block because such data has higher chance of being erased at the same time. This can reduce data movement during garbage collection and decrease the write amplification factor (WAF) in the future. The firmware usually issues a NAND program command for the data in the open block when the accumulated data reaches to a specific size, which is less than the size of the entire open block. When the program command is processed, its associated RAID parity is calculated at the same time. The operation requires a read (previous XOR result), a XOR (current programmed data), and a write (current XOR result).

When the host desires more open blocks to categorize the data, more RAID parity buffers are required. If the RAID parity buffers are stored in DRAM, the available storage area is relatively small. However, since DRAM is usually the bottleneck of performance, and a RAID operation consumes much DRAM bandwidth, performance will be significantly impacted. If the RAID parity buffers are stored in SRAM, there is little or no impact on the performance, but the cost is very high. As the inventors have discovered, a RAID cache can be used to find the balance between storage area and performance. The cache scheme has two main considerations. The first is the number of cache buffers (SRAM). The more cache buffers, the higher the cache hit rate, but also the higher the cost. The second is the algorithm that is used to increase the cache hit rate.

Figure 5:
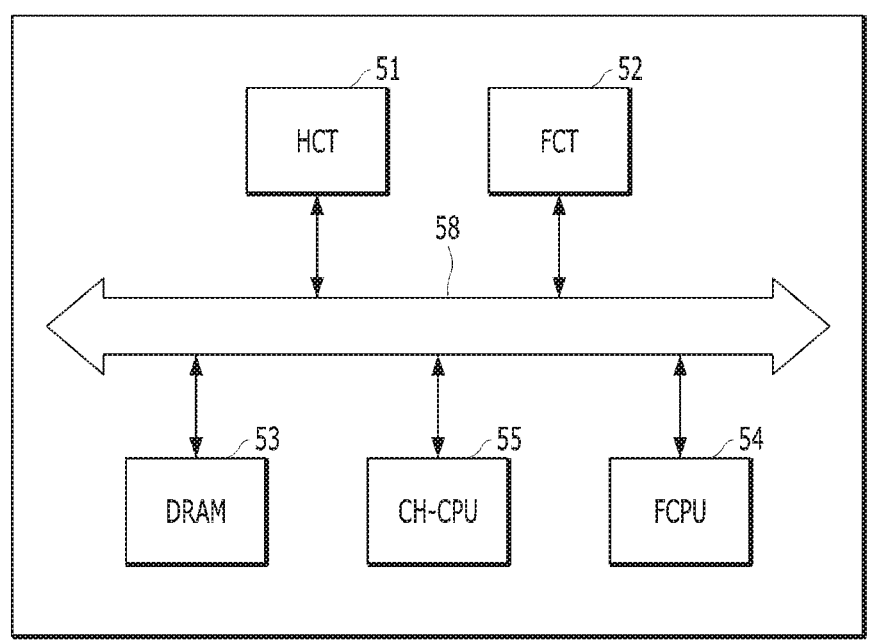
FIG. 5 illustrates an example of an SSD controller.

FIG. 5 shows an example of an SSD controller 50, the two major components of which are a host controller (HCT) 51 and a flash controller (FCT) 52, The HCT 51 and FCT 52 may be separate as shown in FIG. 5, or may be different functional units of control component 120 of FIG. 2. The HCT 51 handles the host protocol and transfers data between host memory and internal DRAM 53 of the SSD controller 50. The FCT 52 controls the FTL, which transfers data between the internal DRAM 53 and a NAND memory, e.g., the memory device 200 configured as a NAND. When the host sends a write command to the HCT 51, the data is delivered by the HCT 51 to the DRAM 53, where such data accumulates. The DRAM 53 must have enough buffers for holding all the host data of open blocks. When enough data has been accumulated, an FCT CPU (FCPU) 54 which handles FTL, e.g., FTL 125, triggers a channel processor (CH-CPU) 55 to start the NAND programming process. Components 51-55 may be coupled through a bus 58.

Currently, the FCPU 54 first sends a write command to the CH-CPU 55 through die queues. The CH-CPU 55 then runs Quality of Service (QoS) arbitration on the die queues and determines which command to process first. Once a command is selected, the FCT data path is triggered to transfer data from the DRAM 53 to NAND. The data path uses the RAID parity cache to compute the RAID parity while transferring data. Since the FCT 52 currently only supports a few open blocks, the RAID cache is designed to hold the RAID parity buffers of all open blocks. Although the DRAM bandwidth is not affected by the RAID operation, this architecture is expensive when the number of open blocks increases.

In accordance with embodiments of the present invention, a new architecture is provided to support more open blocks within an acceptable range of cost and performance. To this end, FIG. 6 illustrates an arrangement and configuration of components, along with processing flow in the context of a parity cache scheme, in accordance with an embodiment of the present invention.

Structurally, an SSD controller 60 includes a DRAM 61 that is configured with data buffers 62 and parity buffers, i.e., RAID parity buffers 63. The SSD controller 60 also includes cache, i.e., RAID cache 64 and a cache controller, i.e., RAID cache controller 65. Data is transferred from the SSD controller 60 via an FCT data path 66 to a NAND memory device 80, which includes open blocks 81.

The DRAM 61 is sized to hold a sufficient number of RAID parity buffers 63 to accommodate all of the open blocks 81. The number of RAID parity buffers 63 may be equal to the number of open blocks 81.

The RAID cache 64 is sized based on the size of the DRAM 61. The RAID cache controller 65 is configured to cache-miss cases (cache evict and load).

The SSD controller 60 also includes an FTL 67 from which commands flow and which may otherwise operate similar to FTL 125 of FIG. 2. An open block queue (OpenBlock Queue) 68 is configured with multiple queues, one for each open block. The queue for a given open block accumulates commands for that block. Such arrangement helps to increase the cache hit rate.

The architecture also includes open block counters (OBCs) 69, one associated with each of the queues of open block queue 68. The corresponding counter 69 keeps track of the number of on-going commands for its associated open block. This helps facilitate an arbitration process that is performed by an open block queue (OBQ) arbiter 71, which may correspond to the CH-CPU 55.

A further feature of the improved arrangement is that there is a unique ID (OBID) for each open block.

With these modifications, the FCPU 54 sends a write command to the CH-CPU 55 through the OBQ 68. The write command contains the OBID of the associated open block. The CH-CPU 55 runs arbitration among the OBQs 68. Once a particular OBQ 68 is selected, the write commands within the selected OBQ 58 are forwarded to a die queue (Die Queue) 72. More specifically, the die queue 72 includes multiple queues, one for each of the queues of OBQ 68. Thus, the write commands in the selected OBQ 68 are forwarded to the corresponding die queue 72. The OBC 69 of the selected OBQ 68 is then increased based on the number of commands that have been forwarded. After the forwarded commands are completely processed, represented by CMD processing block 73, the OBC 69 of the selected OBQ 68 is decreased by a corresponding amount. In the data path, the OBIDs is used to manage the RAID cache 64.

Cache hit rate determines performance. The cache hit rate, in turn, depends on the size of the RAID cache 64 and OBQ arbitration. The RAID cache size depends on the number of RAID parity buffers 63 and the buffer size. The buffer size is determined by the protection level of the RAID, such as die-level, plane-level, or page-level. The minimum number of RAID parity buffers 63 is determined by the number of open blocks 81 to be programmed to NAND simultaneously (worst case) in order to meet a sequential write requirement.

The following equation shows the calculation. Minimum number of RAID parity buffers $63 = 1 + \text{Ceil}(T_{prog} * TP_{ch} / P_{size})$, where $T_{prog}$ is the average program time of NAND 80; $TP_{ch}$ is the minimum required NAND channel throughput to meet a sequential write throughput, and $P_{size}$ is the data size for the largest die programming operation (multiple planes). "Ceil" denotes a ceiling function.

Note that this calculation does not consider garbage collection (GC). Thus, one more RAID parity buffer may be added for the GC, such that GC has no impact on the write performance.

OBQ arbitration is performed, e.g., by OBQ arbiter 71 or CH-CPU 55, to increase the cache hit rate. The following rules or conditions may be used in the OBQ arbitrations.

An urgent priority condition: two or more open block queues have pending commands and the number of such commands in each queue reaches a specified threshold (which may be set or determined by the firmware); the queue with the highest number of commands is selected.

A high priority condition: each of multiple open block queues has a non-zero OBC; the open block queue with the higher OBC is selected.

A low priority condition: each of multiple open block queues has at least one pending command; the open block queue that has more pending commands is selected.

If the urgent priority condition is being applied and multiple open blocks are equal in terms of that condition, the high priority condition should be used to decide. If the high priority condition is being applied and multiple open blocks are equal in terms of that condition, the low priority condition should be used to decide. If multiple open blocks are identical in terms of all three conditions, then a round robin procedure should be employed.

Once a particular one of OBQ 68 is selected, all of the pending commands in that queue should be processed, i.e., forwarded to the corresponding die queue 72, where such commands await command processing 73.

The rules or conditions may be implemented in firmware to maintain flexibility, since there may be other algorithms which are highly dependent on the rules/conditions.

FIG. 7 is a flow chart describing steps in processing commands in a memory system in accordance with embodiments of the present invention. The steps shown in flow chart 700 are exemplary. Those skilled in the art will understand that additional and/or alternative steps may be performed, or that the order of steps may be changed, to effectuate aspects of the present invention without departing from the inventive concepts disclosed herein. FIG. 7 is described with reference to other figures, particularly FIG. 6.

Referring to FIG. 7, at step 701, commands, e.g., write commands, are transmitted by a host and received by a memory system. At step 702, the received commands are collected in multiple open block queues (OBQs). Preferably, one OBQ is provided for each open memory block, and commands from a given block are accumulated in the corresponding OBQ.

An arbitration process is then performed on the OBQs in step 703. The arbitration process includes applying a particular rule to select one of the OBQs. Based on the particular rule applied, at step 704, the commands in the selected OBQ are forwarded for processing. This is followed by step 705, in which the open block counter (OBC) of the selected OBQ, which represents the total number of commands forwarded for the selected OBQ, is increased by the number of commands forwarded from the selected OBQ in step 704.

After the commands forwarded in step 704 are completely processed, in step 706, the count of the OBC of the selected OBQ is decreased by the number of commands forwarded in step 704. This involves resetting the corresponding OBC, when all commands in that OBC are forwarded in a particular forwarding operation.

As the foregoing demonstrates, embodiments of the present invention provide improved architecture and operations for an improved RAID parity cache scheme, which may be employed in a RAID parity or Chipkill scheme.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A memory system, comprising:
   a memory device that includes a plurality of open blocks, each having a unique identifier; and
   a memory controller including:
      dynamic random access memory (DRAM) configured with a plurality of parity buffers sized to accommodate all data of all of the open blocks,
      a cache and a cache controller in communication with the DRAM,
      a plurality of open block queues corresponding to the plurality of open blocks respectively, each open block queue configured to accumulate commands for the corresponding open block,
      a plurality of open block counters, one associated with each of the plurality of open blocks, each open block counter being configured to maintain an on-going count of the number of commands from the corresponding open block forwarded for processing,
      a plurality of die queues corresponding to the plurality of open block queues respectively, and
      an arbiter configured to arbitrate with respect to the open block queues to determine an order in which commands in the plurality of open block queues are to be processed.

2. The memory system of claim 1, wherein the plurality of parity buffers comprise redundant array of independent disks (RAID) parity buffers and the cache comprises a RAID cache.

3. The memory system of claim 1, wherein each of the plurality of open block counters is embodied in its associated open block queue.

4. The memory system of claim 1, wherein the commands are received by the memory controller from a host, each of the commands having a tag identifying a particular one of the open blocks when received by the memory controller.

5. The memory system of claim 1, wherein the cache has a size that is set based on the number and size of the parity buffers.

6. The memory system of claim 5, wherein the number of parity buffers is based on a number of open blocks that are programmed at the same time to maintain a sequential write requirement.

7. The memory system of claim 6, wherein the number of parity buffers is increased by one to accommodate a background operation.

8. A command processing system, comprising:
   an arbiter configured to arbitrate with respect to open block queues, each of which holds a group of commands, to select one of the open block queues based on current counts of a number of commands forwarded from each of the open block queues for processing;
   die queues, one associated with each of the open block queues, to receive commands forwarded from the respective open block queues; and
   a command processor for processing commands from the die queues.

9. The command processing system of claim 8, further comprising:
   a dynamic random access memory DRAM) configured with parity buffers sized to accommodate all data of all open blocks; and
   a cache and a cache controller in communication with the DRAM.

10. The command processing system of claim 8, wherein the command processing system is embodied in a memory system.

11. A method for processing commands in a memory system including a plurality of open blocks, the method comprising:
   sending each of plurality of commands received by the memory system to one of a plurality of open block queues, each command containing a tag identifying a particular one of the open blocks;
   arbitrating among the open block queues to select one of the open block queues based on a set of rules that are selectively applied to increase cache hit rate;
   forwarding the commands in the selected open block queue for processing;
   increasing a count of a total number of commands forwarded for the selected open block queue by the number of commands forwarded in the forwarding operation; and
   decreasing the count after the commands from the selected open block queue are processed by the same number by which the count was increased in the increasing operation.

12. The method of claim 11, wherein the rules define different levels of priority conditions.

13. The method of claim 12, wherein the rules include an urgent priority condition that is applied when each of two or more open block queues holds pending commands, the number of which is greater than a threshold, in which case the arbiter selects the open block queue with the most pending commands.

14. The method of claim 12, wherein the rules include a high priority condition that is applied when each of two or more open block queues has a non-zero open block count, in which case the arbiter selects the open block queue with the higher open block count.

15. The method of claim 12, wherein the rules include a low priority condition that is applied when each of two or more open block queues has at least one pending command, in which case the arbiter selects the open block queue with the higher number of pending commands.

16. The method of claim 12, wherein, when multiple open block queues satisfy a particular priority condition, a next lower level priority condition is applied.

17. The method of claim 16, wherein, when multiple open block queues satisfy all priority conditions, a round robin rule is applied.

* * * * *